United States Patent [19]
Bell et al.

[11] Patent Number: 5,659,542
[45] Date of Patent: Aug. 19, 1997

[54] SYSTEM AND METHOD FOR SIGNALLING AND CALL PROCESSING FOR PRIVATE AND HYBRID COMMUNICATIONS SYSTEMS INCLUDING MULTIMEDIA SYSTEMS

[75] Inventors: Robert T. Bell, Garland; Richard B. Platt, Allen, both of Tex.

[73] Assignee: Intecom, Inc., Dallas, Tex.

[21] Appl. No.: 397,945

[22] Filed: Mar. 3, 1995

[51] Int. Cl.$^6$ .................................................. H04L 12/50
[52] U.S. Cl. ........................................... 370/496; 370/522
[58] Field of Search ..................... 370/60, 60.1, 110.1, 370/58.1, 58.2, 94.1, 94.2; 379/251, 258, 268, 68.1, 76, 110.2, 110.3, 85.13

[56] References Cited

U.S. PATENT DOCUMENTS

| | | | |
|---|---|---|---|
| 5,212,691 | 5/1993 | Hokari | 370/110.1 |
| 5,450,402 | 9/1995 | Shobu | 370/110.1 |
| 5,479,402 | 12/1995 | Hata et al. | 370/110.1 |
| 5,490,251 | 2/1996 | Clark et al. | 370/110.1 |

*Primary Examiner*—Douglas W. Olms
*Assistant Examiner*—Ajit Patel

*Attorney, Agent, or Firm*—Hitt Chwang & Gaines, P.C.

[57] ABSTRACT

A system and method for selectively establishing a user information path over an information transport network between first and second endpoints of first and second private network partitions, respectively. The system comprises: (1) signalling circuitry, associated with the first and second private network partitions, adapted to establish a signalling channel adapted to communicate signalling messages between the first and second private network partitions, the signalling channel allowing: (a) the first private network partition to initiate a call request to the second private network partition to request initiation of a call from the first endpoint to the second endpoint and (b) the second private network partition to initiate a response to said call request of the first private network partition to acknowledge that the second endpoint is able to receive the call from the first endpoint and (2) switching circuitry, associated with the first and second private network partitions, adapted to establish a user information path over the information transport network only after the first private network partition receives the response to the call request the user information path adapted to allow point-to-point communication of user information between the first and second endpoints, the user information path never established if the second endpoint is unable to receive the call from the first endpoint.

20 Claims, 4 Drawing Sheets

SYSTEM AND METHOD FOR SIGNALLING AND CALL PROCESSING FOR PRIVATE AND HYBRID COMMUNICATIONS SYSTEMS INCLUDING MULTIMEDIA SYSTEMS

CROSS-REFERENCE TO RELATED APPLICATIONS

This application is related to the following U.S. patent applications:

| Serial No. | Title | Inventor(s) | Filing Date |
|---|---|---|---|
| 08/397,986 | BRIDGING AND SIGNALLING SUB-SYSTEMS AND METHOD FOR PRIVATE AND HYBRID COMMUNICATIONS SYSTEMS INCLUDING MULTIMEDIA SYSTEMS | Robert T Bell, et al. | March 3, 1995 |
| 08/379,365 | MULTIMEDIA SYSTEM HAVING CENTRAL POWER SOURCE AND DISTRIBUTION SUBSYSTEM | Richard K. Hunter, et al. | January 27, 1995 |

The above-listed applications are commonly assigned with the present invention and are incorporated herein by reference as if reproduced herein in their entirety.

TECHNICAL FIELD OF THE INVENTION

The present invention is directed, in general, to multimedia systems and, more specifically, to a system and method for achieving true endpoint-to-endpoint signalling without the need to establish a user information path until the path is required to complete a call between the endpoints.

BACKGROUND OF THE INVENTION

Currently, "Information superhighway" and "multimedia" are probably the most often spoken and least often understood aspects of a coming revolution in data communication. Although issues specific to an information superhighway are beyond the scope of the present discussion, interactive multimedia systems are very much within the present scope.

An interactive multimedia system is broadly defined as a system capable of processing, storing, communicating and coordinating data pertaining to visual information, aural information and other information. Visual information is generally divided into still picture or graphics and full motion video or animation categories. In the vernacular of those involved in multimedia, such visual information is generically referred to as "video." Aural information is generally divided into speech and non-speech categories and is generically referred to as "voice." "Other information" is directed primarily to computer data, often organized in files and records, and perhaps constituting textual and graphical data. Such computer data are generally referred to as "data."

To date, multimedia has, for the most part, been limited to stand-alone computer systems or computer systems linked together in a local area network ("LAN"). While such isolated systems have proven popular and entertaining, the true value of multimedia will become apparent only when multimedia-capable wide area networks ("WANs") and protocol systems are developed, standardized and installed that permit truly interactive multimedia. Such multimedia systems will allow long distance communication of useful quantities of coordinated voice, video and data, providing, in effect, a multimedia extension to the voice-only services of the ubiquitous telephone network.

Defining the structure and operation of an interactive multimedia system is a critical first step in the development of such system. Accordingly, before entering into a discussion herein of more specific design issues, it is important to discuss more general questions that need to be resolved concerning design objectives of the system as a whole and some generally agreed-upon answers and specifications.

Interactive multimedia may be thought of as an electronic approximation of the paradigm of interactive group discussion. It involves the interactive exchange of voice, video and data between two or more people through an electronic medium in real time. Because of its interactive and real-time nature, there are some stringent requirements and required services not normally associated with multimedia retrieval systems. Some of the more obvious examples of those requirements and services include latency (transmission delay), conferencing, availability ("up-time") and WAN interoperability.

The evolution of existing private branch exchange ("PBX") and LAN topologies towards a composite interactive multimedia system based upon client/server architectures and isochronous networks is a natural trend. However, to merge the disparate mediums of voice, video and data successfully into a cohesive network requires that three fundamental integration issues be defined and resolved. The first of the fundamental integration issues is quality of service ("QoS"). QoS is defined as the effective communication bandwidth, services and media quality coupling of separate equipment or "terminals" together and the availability ("up-time") of the same. QoS parameters are divided into four groups: 1) terminal QoS, 2) network QoS, 3) system QoS, and 4) availability requirements. Thus, QoS parameters must be defined for both terminal equipment ("TE") and network equipment ("NE") governing the communication of data between the TE. System QoS is derived from a combination of terminal and network QoS. The suggested values for QoS parameters are considered to be a practical compromise between required service quality, technology and cost. See, Multimedia Communications Forum ("MMCF") Working Document "Architecture and Network QoS", ARCH/QOS/94-001, Rev. 1.7, MMCF, (September 1994) and ITU-T Recommendation I.350 "General Aspects of Quality of Service and Network Performance in Digital Networks, including Integrated Services Digital Networks ("ISDNs"), (1993). The following Table I summarizes some suggested parameters for terminal QoS.

TABLE I

Terminal QoS Parameters

| Parameter Type | Parameter Value | Parameter Explanation |
|---|---|---|
| Audio Frequency Range | 3.4 kHz | Optimization is for voice, and is consistent with existing Legacy voice systems. |
| Audio Level | −10 dBmO | Optimization is for voice, and is consistent with Legacy voice |

TABLE I-continued

Terminal QoS Parameters

| Parameter Type | Parameter Value | Parameter Explanation |
| --- | --- | --- |
| Audio Encoding | G.711 (8-bit pulse code modulation ("PCM")) | systems. Consistent with Legacy voice systems. |
| Video Resolution | ≧352 × 288 (SIF) | Minimal acceptable size for video conferencing. |
| Video Frame Rate | ≧20 frames per second (fps) | Minimal optimization for detection of facial expression transitions. |
| Voice/Video Intramedia-Intermedia Differential Delay | <100 milliseconds (ms) | A differential delay greater than 100 ms between voice & video is noticeably significant. |
| Video Encoding | H.261 & Motion Picture Experts Group ("MPEG")-1 | H.261 meets WAN interoperability, MPEG-1 is more consistent with desktop trends and quality requirements. |
| Intramedia Latency (TE) | <100 ms | The delay of the TE itself for encoding and framing purposes. |
| User Data Rate | ≧64 kbps | Minimal acceptable data bandwidth for data sharing applications. Consistent with ISDN Basic Rate Instrument ("BRI"). |
| Data encoding | HDLC encapsulation | Consistent with isochronous service bearer channels. |

Network QoS parameter requirements consist of those parts of the system that are between two TE endpoints. This includes a portion of the TE itself, the private network (if required), and the public network (if required). Some of the requirements imposed upon the network QoS are a result of the terminal QoS parameters. The following Table II summarizes the network QoS requirements.

TABLE II

Network QoS Parameters

| Parameter Type | Parameter Value | Parameter Explanation |
| --- | --- | --- |
| Intramedia Latency (NE) | <50 ms | Intramedia latency is the delay between source TE transmission and destination TE reception; i.e. the delay of NE. |
| Network Capacity | ≧1,536 kbps | G.711 Audio (64 kbps), MPEG-1 Video (1,344 kbps), HDLC data (128 kbps). |

The system QoS encompasses the terminal and network elements. The particular value critical to the system is the intramedia latency. The following Table III summarizes this value that is the sum of the terminal and network values for the same parameter.

TABLE III

System QoS Parameters

| Parameter Type | Parameter Value | Parameter Explanation |
| --- | --- | --- |
| Intramedia Latency (System) | <150 ms | Intramedia latency is the delay between source transmission and destination reception. It includes latency imposed by the source and destination TEs as well as the NE. These latency values might include encoding and decoding delays, transmission delays, and adaptation delays. |

The system QoS parameter of Intramedia Latency is the sum of twice the TE and the NE latency. Intramedia Latency parameter value is bounded by voice requirements since latent delay is more readily perceived by the ear than the eye. However, the delay itself is typically a function of video since it is the component requiring the most time for encoding and decoding.

Availability ("up-time") includes several aspects. In particular, the network elements have very strict requirements. These requirements are typical of private branch exchanges ("PBXs") and other private network voice equipment, but are very atypical of Legacy LANs. Most LANs are susceptible to power-losses, single points of failure, and errant TE. An interactive multimedia system must closely follow the availability requirements of the legacy voice systems. The following Table IV summarizes Availability QoS parameters.

TABLE IV

Availability QoS Parameters

| Parameter Type | Parameter Value | Parameter Explanation |
| --- | --- | --- |
| TE Power Requirements | 5 watts (W) of phantom power (48 volts (V)) | This power requirement is consistent with the ISDN BRI requirements and will allow the least common denominator of voice to function. |
| NE Power Requirements | Uninterruptable power supply ("UPS") | NE must be UPS capable including private NE. |
| Single point of failure | 12 Users | No more than 12 users should be impacted by a single point of failure. |
| Error Free Seconds Ratio ("EFS") | >99.9% | Meets requirement of random bit error rate of $10^{-6}$. |

The availability requirements are defined solely within the context of the private network. Additional availability parameters are discussed in G.821. See also, MMCF Working Document "Architecture and Network QOS", ARCH/QOS/94-001, Rev. 1.7, Multimedia Communications Forum, Inc., (September 1994) and TR-TSY-000499, Transport Systems Generic Requirements (TSGR): Common Requirements, Bellcore Technical Reference, Issue 3, (December 1989).

The second of the fundamental integration issues is network services. Network services include transport services, connection management and feature management. Multimedia communication involves the transmission of data having more varied characteristics than video, voice or data in isolation. Therefore, the manner in which the network transports and manages the flow of video, voice and data is critical to the efficiency, flexibility and overall effectiveness of the network.

Transport services can be categorized into three groups: 1) packet, 2) circuit and 3) cell. The following Table V summarizes different aspects of each of these transport services.

TABLE V

| Transport Services | | | |
| --- | --- | --- | --- |
| | Packet | Circuit | Cell |
| Typical technology | Ethernet®, Token Ring®, Frame Relay®, etc. | ISDN, T1 | Asynchronous Transfer Mode ("ATM") |
| Media optimization | Packet data | Isochronous data (voice, video) | Packet & isochronous data |
| Transport optimization | Multicast, shared medium operations | Point-point full-duplex low-cost switching | Point-point, full-duplex, high-speed switching |
| Optimized data size | 1500 bytes (Ethernet®) | 1 byte (voice) | 48 bytes |
| Transport Overhead | 4.2% (64 bytes - IP) | none | 11.3% (6 bytes - AAL1) |
| Transport Methodology | Shared | Switched | Switched |
| Route Methodology | Routing | Signalling (circuit switching) | Signalling (virtual circuit switching) |
| Typical Deployment | Widespread. Deployed as LAN | Widespread. Deployed as both public network and private NE | Very few installations. Typically deployed as private backbone network |

Interactive multimedia requires the usage of an isochronous network because of the QoS requirements for voice and video. While it is possible to construct a packet network with sufficient bandwidth, buffering and intelligence to accommodate synchronous traffic it is considered to be prohibitively expensive and unnecessary. Nevertheless, both the LAN, PBX and WAN require interoperability.

At some point it is expected that the entire private network infrastructure will employ ATM. This will transpire upon the occurrence of several events. First, WANs must adapt to support ATM Points-of-Presence ("POPs"). Second, the telephone must disappear from the premise (replaced by an ATM audio device). Third, packet-based LAN TE must become ATM TE. Fourth, phantom power must be supported to the ATM TE (for availability purposes). Fifth, an 8 kHz synchronous clock must be supported and managed by all ATM equipment. Finally, the price of ATM TE and NE must approach that of Ethernet®, ISDN, and isoEthernet® equipment.

Regardless of the interim private network infrastructure, ATM is the only backbone solution for the private network. It is the only scalable switching architecture that can transport packet and isochronous data. Furthermore, because it is deployed as a backbone, the aforementioned issues do not apply.

Connection management is the process employed by the private and public network routing functions. Because packet routing is a well established and defined process, it is not discussed further. Connection management within the confines of an isochronous network for interactive multimedia is a newer technology (albeit with old roots) and deserves discussion.

Signalling for circuit and cell switching is best defined by the ISDN signalling standards (see, TR-NWT-000938, Network Transmission Interface and Performance Specification Supporting Integrated Digital Services Network (ISDN), Bellcore Technical Reference, Issue 1, (August 1990)), isoEthernet® signalling (see, IEEE Proposed Standard 802.9a, "Isochronous services with Carrier Sense Multiple Access with Collision Detection (CSMA/CD) Media Access Control (MAC) service", (December 1994)) and ATM signalling (see, ATM Forum, "ATM User-Network Interface Specification-Version 3.0", (September 1993) and ITU-T Recommendation Q.293x, "Generic Concepts for the Support of Multipoint and Multiconnection Calls"; (1993)). Historically, isochronous networks carry the signalling channel as an isochronous channel. Nevertheless, the signalling function can be shown to be better suited to a packet channel. A hub/routing function is the ideal location to perform the bridging between an isochronous signalling channel and a packet signalling channel. The natural packet protocol choice for a signalling channel is an Internet Protocol ("IETF IP"). Available on most LAN networks, as well as global routing capability, IP greatly enhances the signalling requirement of interactive multimedia.

Feature management consists of the management of those features provided by the private and public network for interactivity purposes. The PBX is followed as a model for interactive multimedia features. The following Table VI summarizes some of the more common features.

TABLE VI

| Feature Management | | |
| --- | --- | --- |
| System Services | User Services | Maintenance |
| Account Codes | Buzz Station | Automatic Restart |
| Authorization Codes | Callback | Connection Detail Recording |
| Automatic Number Identification | Call Forward | Default Installation |
| Direct Inward Dialing ("DID") | Call Park | Class of Service |
| Direct Outward Dialing ("DOD") | Call Pickup | Hot Configuration |
| Hunt Groups | Call Waiting | |
| Multimedia on hold | Do Not Disturb/Override | |
| Network Numbering Plan | Hold/Consultation Hold | |
| Number Dial Plan | Last Number Redial | |
| Shared Resource Queuing | Multiple/Shared Call Appearances | |
| System Speed Dialing | Conference (multiparty) | |
| Vacant Number Intercept | Transfer | |

The third of the fundamental integration issues is interoperability. An interactive multimedia system by nature implies interoperability, because a multimedia network as envisioned is too large and far-flung to employ the equipment of only a single supplier. Therefore, standards must be established that allow equipment from different suppliers to interact smoothly. To this end, interoperability must extend to transport mechanisms, signalling and compression standards.

There are certain existing communication technologies that must be supported and others that are used. A truly interoperable interactive multimedia system should guarantee that the physical and logical interfaces of each component adheres to a standard. Prior to 1992, this would have been almost impossible. The present day affords the opportunity to evolve the proprietary telephony of the PBX and the proprietary video of the video conferencing systems into standards-based systems in the same manner that the data systems evolved from proprietary mainframes to the standards-based LAN systems of today. The following Table VII summarizes the required standards of interoperability.

TABLE VII

Interoperability Standards

| Transport Standards | Signalling Standards | Compression Standards |
|---|---|---|
| isoEthernet ® (IEEE 802.9a) | ISDN NI-2 | G.711, G.722 (Audio) |
| ATM | QSIG | H.221 (Video) |
| ISDN | Q.2931 | MPEG-1 (Video) |
|  | H.320 (Audiovisual) |  |

In addition to the standards required for communications, there are other specifications relating to application programming interfaces for terminal and server control. These include Microsoft® Telephony Application Programming Interface ("TAPI®"), Novell® Telephony Service Application Programming Interface ("TSAPI®") and Microsoft® Open DataBase Connectivity ("ODBC®").

Having now set the stage with a discussion of general issues concerning multimedia systems, more specific design issues may now be discussed. The specific design issue of concern is provision of signalling within a private network or a hybrid network and the most proficient manner to accomplish the signalling function between stations or nodes in the network.

Traditionally, isochronous devices such as telephones and video conferencing equipment have signalled in-band. "Inband," in traditional telephony, is defined as use of the same physical path for signalling and user information, such as voice, circuit mode and video data. In contrast, ISDN employs a D-channel, that, although carried over the same physical medium as the B-channels, is logically regarded as a separate channel. In the telephony world, this is defined as "out-of-band" signalling.

However, since signalling services are intermittent processes, it is not necessary to perform this signalling within an isochronous channel. In fact, there is great benefit to be achieved by performing this signalling over a packet service. The key advantages to signalling over a packet service include backbone signalling with simple physical circuit connectivity, routing, remote control, and other operational benefits.

In further support of packet-based signalling, as the size and complexity of modern private and hybrid private/public networks increase, the mechanisms for communication of signalling information from one node to another become increasingly cumbersome and/or expensive. The simplest signalling network is a fully-webbed net in which each node has a direct connection to every other node in the network. This becomes prohibitively expensive as the number of nodes increases. The number of connections needed is equal to (n(n-1))/2, where n is the number of nodes. If the network is configured to use fewer inter-nodal signalling paths, the complexity of the network topology increases significantly as the number of nodes increases. Modern packet technology allows for the establishment of multiple virtual connections without requiring full webbing of the physical connections. The problem is to develop a process for using this capability and applying it to private network signalling procedures such as QSIG.

Assuming that modern technology subsumes a packet-based signalling system that creates virtual connectivity between nodes or partitions in a private or hybrid communication system, there are still other aspects of signalling that require attention. Moreover, one of those aspects of signalling is the separation of the call control process from the circuit connection process. Because these two processes are implicitly separate, simplicity is achieved in call control through non-native networks. By establishing a connection and management link between nodes or partitions independent of the circuit connection, feature management may also be transparently achieved. This is an absolutely essential feature for applications that traverse the public network or other networks not natively supporting the desired feature set.

The Consultative Committee on International Telephone and Telegraph ("CCITT") developed Signalling System Number 7 ("SS7") in 1980 and subsequently modified it in 1984 and 1988. SS7 accomplished separation of the signalling function from circuit connectivity. SS7 supports several functions including call management (including call setup, supervision, routing and billing), transferring account information between nodes, network management and network maintenance. However, application of SS7 is confined to the public network, thereby excluding the private network from feature transparency.

SS7 architecture employs three major components, the Service Switching Point ("SSP"), the Signalling Transfer Point ("STP") and the Service Control Point ("SCP"). When the local exchange network connects via SS7 to the Interexchange Carriers' ("IEC") networks, it will have its own STP and SCP connecting to end offices and the IECs.

The SSP is a tandem switch in the interexchange network or an end office in the Local Exchange ("LEC") network. The STPs are packet switching nodes, and the SCPs are databases of circuit, routing, and customer information.

When the SSP receives a service request from a local end office or a user attached on a direct access line, it formats a service request for the SCP and suspends call processing until it receives a reply. The SSP forwards the request to the STP over the packet network.

The STPs are interconnected over a high speed packet network that is heavily protected from failure by alternative paths. STPs are deployed in pairs so that the failure of one system will not affect call processing. STPs pass the call setup request to an SCP over direct circuits or by relaying it to another STP.

The SCP is a high speed database engine that is also deployed in pairs with duplicates of the database. The database has circuit and routing information, and for customers that are connected through a virtual network, the database contains customer information such as class of service, restrictions, and whether the access line is switched or dedicated. The SCP accepts the query from the STP, retrieves the information from the database, and returns the response on the network. The response generally takes the same route as the original inquiry.

In addition, SS7 uses a layered protocol that resembles the Open Systems Interconnection ("OSI") model, but it has four layers rather than seven. The first three layers are called the Message Transfer Part ("MTP"). The MTP is a datagram service, which means that it relays unacknowledged packets. The MTP has three layers, which form a network similar to CCITT X.25.

The first layer, the signalling data link, is the physical layer. It is full duplex connection that provides physical STP to STP, SCP to SCP, and STP to SCP links. This layer is a data link that has three functions mainly: flow control, error correction, and delivery of packets in the proper sequence.

The signalling network layer routes messages from source to destination, and from the lower levels to the user part of the protocol. Its routing tables enable it to handle link failures and to route messages based on their logical address.

The fourth layer is called the signalling connection control part. It is responsible for addressing requests to the appropriate application and for determining the status of the application. An application, for example, might be an 800 service request. The ISDN service user part relays messages to ISDN users. The user in this context refers to the interface with the end user's equipment and not to the user itself. The ISDN service user part handles call setup, accounting and charging, and circuit supervision for ISDN connections.

Therefore, SS7 establishes a distinct signalling and circuit path between LECs in the public network, and furthermore creates an operational circuit connection prior to transmitting user information. While SS7 frees up bandwidth in the public network by suspending circuit connectivity until the signalling functions are performed, SS7 is not extended to the private network. As a result, feature transparency within a private or hybrid network, or between nodes or partitions, is not accomplished with SS7.

Accordingly, what is needed in the art are a system and method for achieving true endpoint-to-endpoint signalling without the need to establish a user information path until the path is required to complete a call between the endpoints.

SUMMARY OF THE INVENTION

To address the above-discussed deficiencies of the prior art, it is a primary object of the present invention to provide a system that saves bandwidth within an information transport network providing an isochronous link between private network partitions, and provides feature transparency between the private network partitions.

In the attainment of the above-described primary object, the present invention provides a system and method for selectively establishing a user information path over an information transport network between first and second endpoints of first and second private network partitions, respectively. The system comprises: (1) signalling circuitry, associated with the first and second private network partitions, adapted to establish a signalling channel adapted to communicate signalling messages between the first and second private network partitions, the signalling channel allowing: (a) the first private network partition to initiate a call request to the second private network partition to request initiation of a call from the first endpoint to the second endpoint and (b) the second private network partition to initiate a response to the call request of the first private network partition to acknowledge that the second endpoint is able to receive the call from the first endpoint and (2) switching circuitry, associated with the first and second private network partitions, adapted to establish a user information path over the information transport network only after the first private network partition receives the response to the call request, the user information path adapted to allow point-to-point communication of user information between the first and second endpoints, the user information path never established if the second endpoint is unable to receive the call from the first endpoint.

Thus, the present invention introduces the concept of partition-to-partition signalling independent of the establishment of a user information path. Colloquially, this may be thought of as "pre-band signalling," as the user information path (the "band") is not established until after the preliminary signalling is complete. If this preliminary, signalling indicates that the second endpoint is unavailable (such as occurs when the user associated with the second endpoint is not present or when the second endpoint is busy with another call or otherwise declines the call), the user information path is never established. This results in three distinct advantages. First, if the call never completes, the bandwidth in the information transport network that would have been allocated to the user information path remains free for other use and therefore free of charge. Second, if the call never completes, the information transport network processing time involved in setting up and tearing down the user information path is not expended. And third, feature transparency between the private network partitions becomes achievable.

For purposes of the present invention, "private network partition" is defined as that portion of a private network that is logically or physically separated from other portions of a private network. The present invention allows those separate portions to communicate with one another to a degree not previously possible, thereby allowing feature transparency, wherein the fact that the private network is partitioned is of no operational consequence.

The signalling channel also allows signalling messages to be transmitted directly between the first and second private network partitions. The signalling messages appear as mere data (instead of signalling messages) to the information transport network over which the signalling channel exists. This permits the private network partitions to offer features that the information transport network cannot accommodate or accommodate differently (feature transparency). Additionally, this allows the private network partitions to perform features without incurring charges for the features from the information transport network.

In a preferred embodiment of the present invention, the signalling circuitry establishes the signalling channel over the information transport network. The signalling channel may be a B channel, an ATM virtual channel or an analog channel, or it may be a virtual channel within a packet-based network.

There is no need, however, to use the information transport network to establish the signalling channel. The signalling channel may be established over any communication medium having the necessary bandwidth, latency and reliability characteristics for such signalling.

In a preferred embodiment of the present invention, the information transport network is selected from the group consisting of: (1) a WAN and (2) an ATM network. Thus, the present invention may take advantage of different forms of an information transport network.

In a preferred embodiment of the present invention, the signalling circuitry encapsulates the signalling messages transmitted between the first and second private network partitions in packets, the packets including information uniquely identifying the first and second endpoints. Ser. No. (08/397,986), filed on Mar. 3, 1995, entitled "BRIDGING AND SIGNALLING SUBSYSTEMS AND METHOD FOR PRIVATE AND HYBRID COMMUNICATIONS SYSTEMS INCLUDING MULTIMEDIA SYSTEMS," commonly assigned with the present invention and incorporated herein by reference, is directed to, inter alia, a system and method for encapsulating signalling messages in packets for transmission between signalling nodes. In the manner described therein, the present invention preferably transmits such signalling messages over a non-native medium, e.g., a signalling channel embodied in a packet network.

Although, the present invention preferably provides for "out-of-circuit" signalling wherein the signalling is handled over the packet network and the user information path, carrying the substantive data, is handled in a dedicated isochronous channel over the isochronous network, all types of signalling are compatible therewith. Again, "in-band," for the purposes of the present invention, is defined as use of the same physical path for signalling and user information, such as voice, circuit mode and video data. "In-circuit, out-of-band" is defined, for purposes of the present invention, as signalling that, although carried over the same physical medium as the user information path, is logically regarded as a separate channel. Again out-of-circuit signalling is defined as signalling that traverses a completely different physical circuit than does the user information path.

In a preferred embodiment of the present invention, the signalling circuitry establishes the signalling channel and the switching circuitry establishes the user information path between private network partitions. In this embodiment, a calling party sub-address field of a Q.931 message is used to relate the signalling circuitry massaging and the messages directed to the switching circuitry.

In a preferred embodiment of the present invention, the first and second private network partitions are adapted to communicate data selected from the group consisting of: (1) voice, (2) video and (3) data. Thus, the present invention is fully employable as part of a multimedia system wherein the user information path is adapted to carry multimedia data streams.

In a preferred embodiment of the present invention, the first private network partition comprises a manager subsystem containing the signalling circuitry and a hub subsystem, coupled to the manager subsystem, containing the switching circuitry. The present invention is applicable in multimedia contexts, hybrid or non-multimedia contexts, as the above-detailed advantages of the broad embodiment are universally desired.

In a preferred embodiment of the present invention, the request and response messages are Q.931 signalling messages which may contain QSIG elements. Those of ordinary skill in the art are familiar with the features and advantages of Q.931 and QSIG as a recognized standards for signalling. The present invention takes advantage of the flexibility and wide adoption of both Q.931 and QSIG, preferably encapsulating these signalling messages for transmission over a non-native medium, such as a packet network.

In a preferred embodiment of the present invention, the first and second endpoints comprise integrated services terminal equipment ("ISTE"). Those of ordinary skill in the art will recognize, however, that BRI devices and even plain old telephone sets ("POTS") can take advantage of the feature transparency that the present invention affords. Further, the information transport network is spared the unnecessary bandwidth burden no matter the nature of the originating endpoint.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
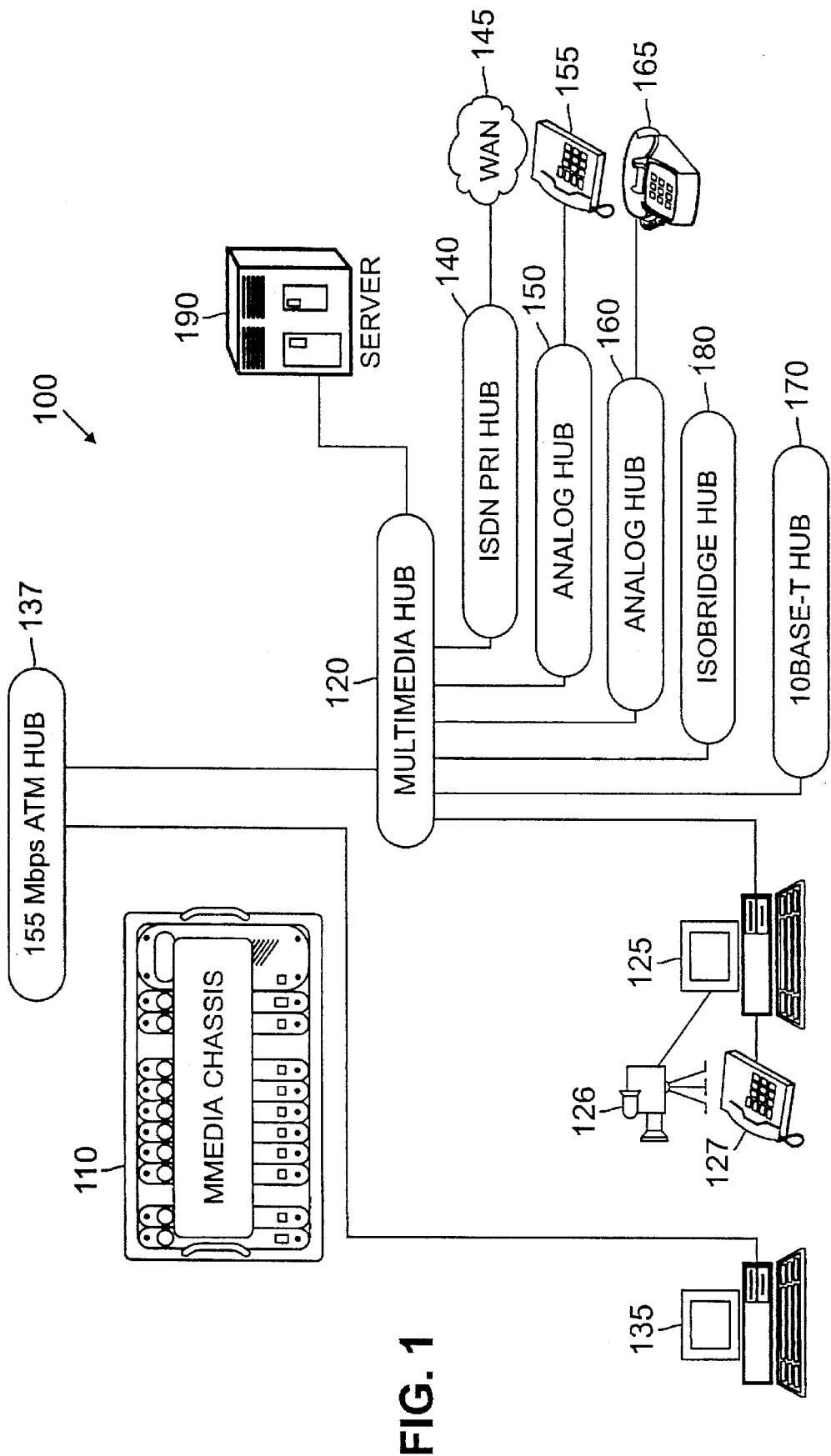
FIG. 1 illustrates a system diagram of an interactive multimedia system employing the signalling subsystem of the present invention.

Referring initially to FIG. 1, illustrated is a system diagram of an interactive multimedia system employing the signalling subsystem of the present invention.

The system, generally designated 100, may comprise a multimedia chassis 110 adapted to receive a plurality of cards therein. The system 100 may alternatively or additionally comprise a plurality of hubs in separate chassis. In the latter case, each of the hubs would contain one of the cards otherwise located in the multimedia chassis 110. Because the hubs are separate from each other, the following discussion will be directed to hubs as opposed to cards in the multimedia chassis 110, although it should be understood that the hubs can as easily exist as cards within the multimedia chassis 110.

A multimedia hub 120 forms a principal component of the system 100. In the illustrated embodiment, the multimedia hub 120 contains the following functions: 10Base-T hub repeater, B-channel switch, isoEthernet® interfaces (allowing a subordinate device such as a multimedia PC 125, including an associated video camera 126 and telephone instrument 127, to be coupled thereto), encapsulated D channel over IP bridge, encapsulated IP over D-channel bridge, tone plant, digital signal processing ("DSP") functions (such as a conference bridge, tone detection, call progress detection, multimedia record/playback and a music interface) and a System Network Management Protocol ("SNMP") agent. Thus, it is readily apparent that most of the system 100 functions involving translation or bridging among standards is handled in the multimedia hub 120.

An ATM hub 137 provides bridging between the multimedia chassis 110 and/or one or more multimedia hubs 120.

This allows the system 100 to interface with an ATM backbone. The ATM hub 137 preferably contains 16 155 Mbps OC-3c ATM interfaces. Thus, the ATM hub 137 can be connected to as many as 16 multimedia hubs 120 or non-multimedia PCs 135. The ATM hub 137 may interface to an ATM backbone (not shown) via a higher rate OC-x ATM hub 137.

An ISDN Primary Rate Instrument ("PRI") hub 140 provides a bridge to a WAN 145 through multiple ISDN T1 or E1 Primary Rate interfaces. The ISDN PRI hub 140 contains two isoEthernet® interfaces. This provides redundant connections between the ISDN PRI hub 140 and the multimedia hub 120.

An ISDN BRI hub 150 provides a bridge for ISDN BRI telephone instruments and interfaces 155. A workstation (not shown) may therefore control its telephone via Ethernet®. The ISDN BRI hub 150 is capable of associating the workstation with its corresponding telephone since the ISDN BRI hub 150 has access to both Ethernet® and D-channel signalling. The ISDN BRI hub 150 appears as the network end to the ISDN BRI instruments and interfaces 155 and supports NI-2 compatible BRI instruments only.

The ISDN BRI hub 150 contains between 12 and 24 BRI interfaces. As with the ISDN PRI hub 140, the ISDN BRI hub 150 contains two isoEthernet® interfaces. This provides redundant connections between the ISDN BRI hub 150 and the multimedia hub 120.

An analog telephony hub 160 provides connectivity for Plain Old Telephone Sets ("POTS") 165. The analog telephony hub contains coder/decoders ("CODECs") and DSP functionality. Consequently, the POTS 165 appear to the system 100 as BRI sets. Furthermore, a workstation (not shown) may control its POTS 165 via Ethernet®. The analog telephony hub 160 is capable of associating the workstation with its corresponding telephone since the analog telephony hub 160 has access to both Ethernet® and D-channel signalling. The analog telephony hub 160 contains 12–24 analog ports. Again, as with the ISDN PRI hub 140 and the ISDN BRI hub 150, the analog telephony hub 160 contains two isoEthernet® interfaces. This provides redundant connections between the analog telephony hub 160 and the multimedia hub 120.

A 10Base-T hub 170 provides 24 SNMP-managed 10 Base-T ports. The 10Base-T hub 170 further provides an Ethernet® AU interface and a single 10Base-F network interface.

An isoBridge hub 180 provides a bridging function between an isochronous network and a packet network. The isoBridge hub 180 is typically used in work-at-home applications wherein an end station is communicating via a fax/modem through an isochronous WAN into a packet-based Ethernet®. The isoBridge hub 180 performs the conversion of fax/modem data and HDLC data to and from Ethernet® packets. The isoBridge hub 180 contains no station interface but does contain two isoEthernet® network interfaces.

A server or multimedia manager 190 is coupled to the multimedia hub 120. The server performs a variety of connection management, feature management and system management functions. The server is preferably comprised of server software executing on widely-available server platforms, such as Intel, MIPS and Digital Equipment Corporation (DEC) Alpha servers. The operating system of choice is Microsoft® Windows® NT Server, adapted to execute on the above-listed servers.

Given this flexible platform, the server 190 is capable of the following features: preemptive multitasking, symmetric multi-processing ("SMP"), security, executing virtual device drivers, multiple packet network stacks (such as TCP/IP and IPX), reliability (redundant array of inexpensive disks ("RAID"), for instance), multiple languages and SNMP management. The server 190 further contains a management function, effected in the illustrated embodiment by Hewlett-Packard's OpenView® and an object-oriented database.

Figure 2:
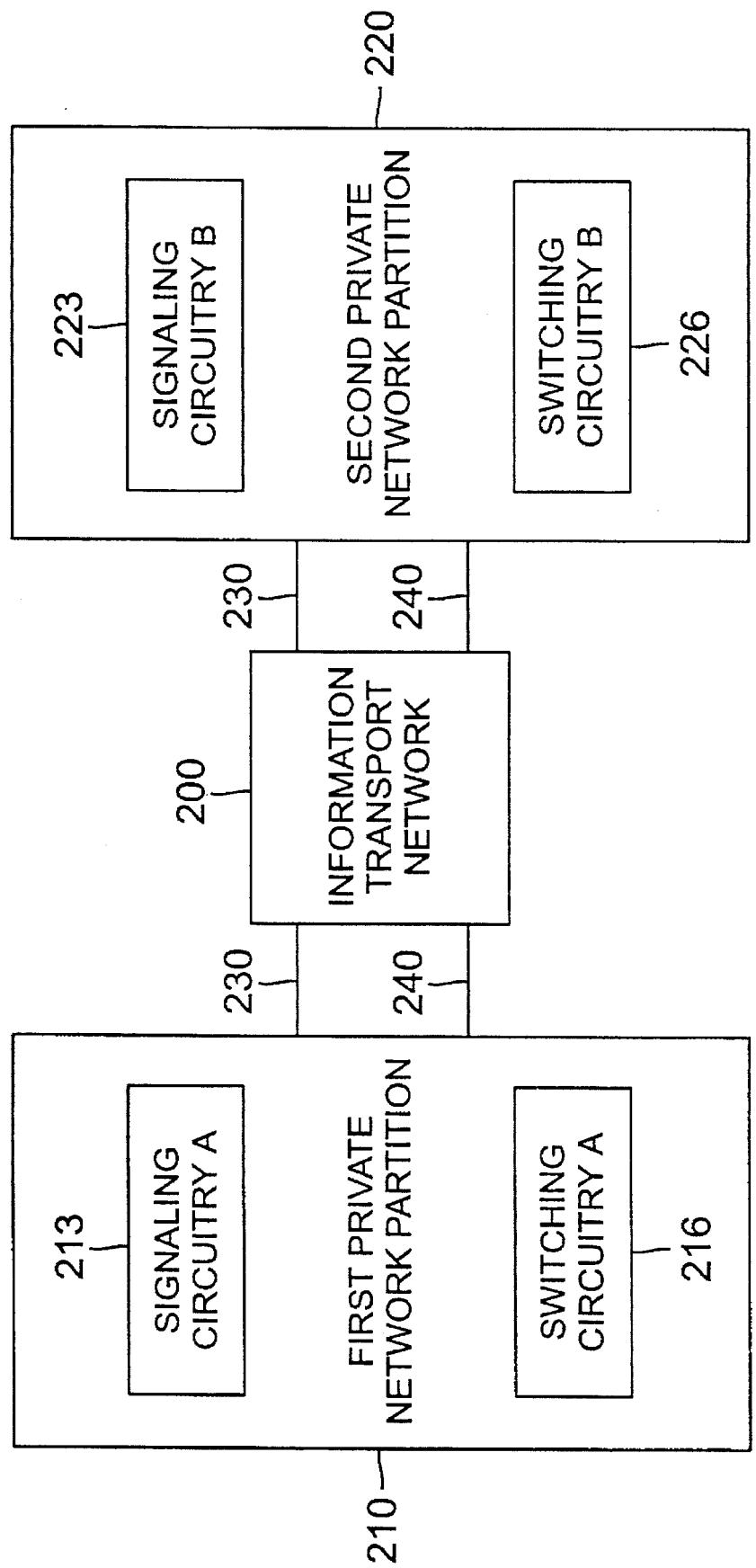
FIG. 2 illustrates a block diagram of first and second private network partitions couplable by an information transport network and including the signalling and switching circuitry of the present invention.

Turning now to FIG. 2, illustrated is a block diagram of first and second private network partitions couplable by an information transport network and including the signalling and switching circuitry of the present invention. The first private network partition 210 is shown with signalling circuit A 213 and switching circuit A 216. The second private network partition 220 is shown with signalling circuit B 223 and switching circuit B 226. It is appreciated that signalling circuits A and B 213 and 223 encompass all types of signalling circuits. The first and second private network partitions 210, 220 are each comprised of system components and hubs as described with respect to FIG. 1.

In the illustrated embodiment, the signalling circuits 213, 223, are located in the multimedia managers 190 (not shown) within the first and second private network partitions 210, 220, and are sequences of executable software instructions executed by general purpose computers. The multimedia managers 190 with the signalling circuitry comprise the manager subsystem. The switching circuits 216, 226 establish the switching matrices through both the private and information transport networks.

The information transport network 200 couples the first and second private network partitions 210, 220 and may be a WAN, an ATM network, or any information transport networks. The signalling circuitry 213, 223 of the manager subsystem, associated with the first and second private network partitions 210, 220, is adapted to establish a signalling channel 230 to communicate signalling messages between the first and second private network partitions 210, 220. The signalling circuitry encapsulates and transmits the signalling messages transmitted between the first and second private network partitions 210, 220 in packets, cells, frames, or other means native to the networks. The switching circuitry 216, 226, associated with the first and second private network partitions 210, 220, is adapted to establish a user information path 240 over the information transport network 200.

The user information path 240 is adapted to allow point-to-point communication of user information between the first and second endpoints (not shown). The first and second endpoints are subordinate devices or ISTEs 125 of the first and second private network partitions 210, 220. However, those of ordinary skill in the art will recognize that the first and second endpoints may include BRI devices 155, POTS 165, or other devices. The user information path 240, carrying voice, video, or data, is selectively established when the signalling functions between the first and second private network partitions 210, 220 are complete. Thus, the present invention introduces the concept of partition-to-partition signalling prior to establishing a user information path 240, or colloquially recounted as "pre-band signalling."

If the preliminary signalling indicates that the second endpoint is unavailable (such as occurs when the user associated with the second endpoint is not present, the second endpoint is busy with another call or the second endpoint declines the call), the user information path 240 is never established in the first place. The fact that the user information path is not established in these circumstances leads to several system operational advantages as previously discussed.

Finally, with respect to FIG. 2, the signalling channel 230, established over the information transport network 200, may be a B channel or a nailed B channel, an ATM virtual channel or an analog channel. There is no need, however, to use the information transport network to establish the signalling channel. The signalling channel may be established over any communication medium having the necessary bandwidth, latency and reliability characteristics for such signalling.

Figure 3:
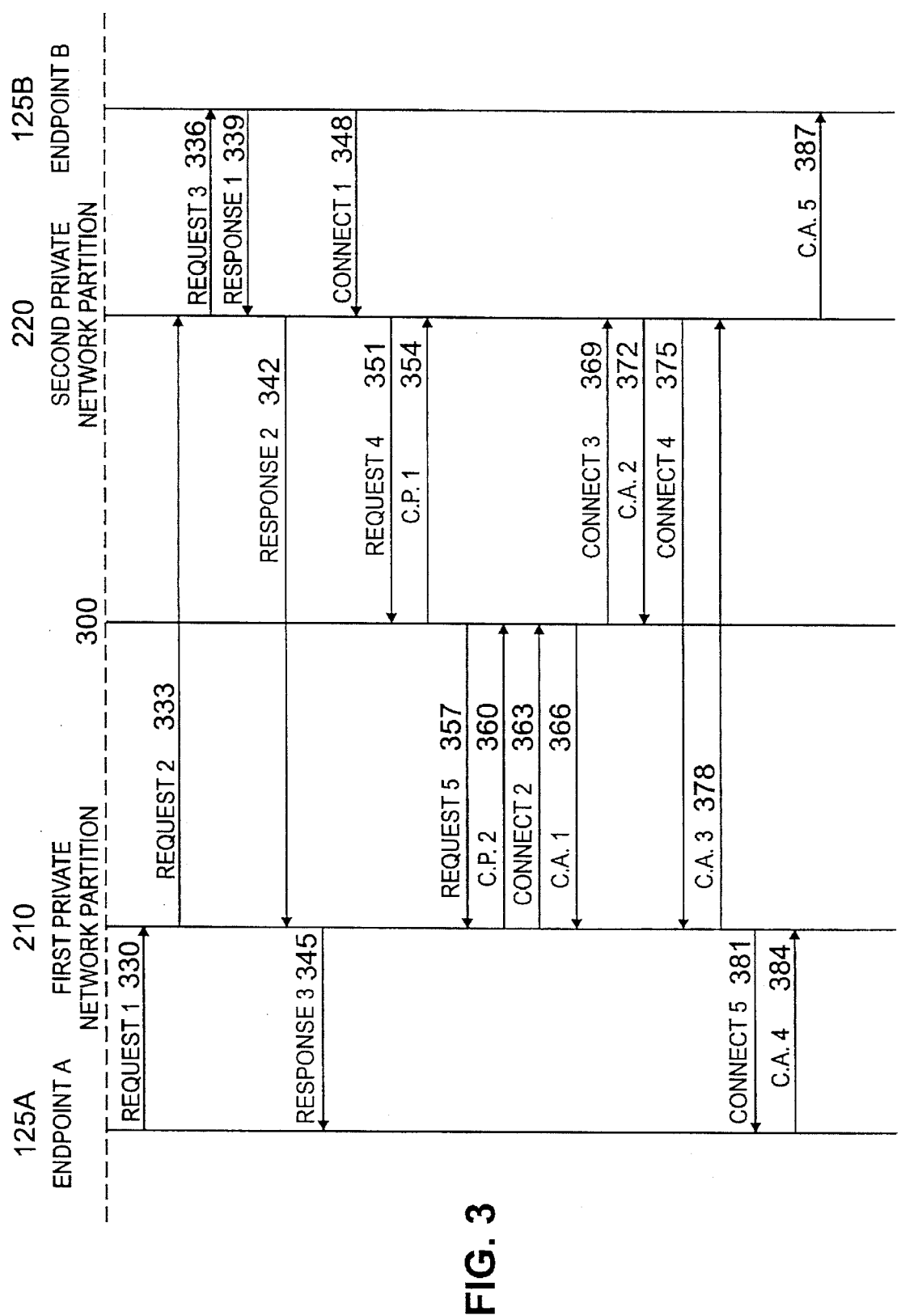
FIG. 3 illustrates a flow diagram of signalling messages between the first and second networks of FIG. 2 wherein the signalling channel and user information path are established over an ATM network.

Turning now to FIG. 3, illustrated is a flow diagram of signalling messages between the first and second private network partitions 210, 220 of FIG. 2 wherein the signalling channel 230 and user information path 240 are established over an ATM network 300. The signalling circuitry 213, 223 establishes the signalling channel 230 over the ATM network 300. The signalling circuitry 213, 223 constructs a Q.931 message with QSIG extensions which is then transmitted on an ATM virtual channel.

The request and response messages are Q.931 signalling messages which may contain QSIG elements. Those of ordinary skill in the art are familiar with the features and advantages of Q.931 and QSIG as a recognized standard for signalling. The present invention takes advantage of the flexibility and wide adoption of both Q.931 and QSIG, preferably encapsulating these signalling messages for transmission over a non-native medium, such as an ATM cell network 300.

Figure 4:
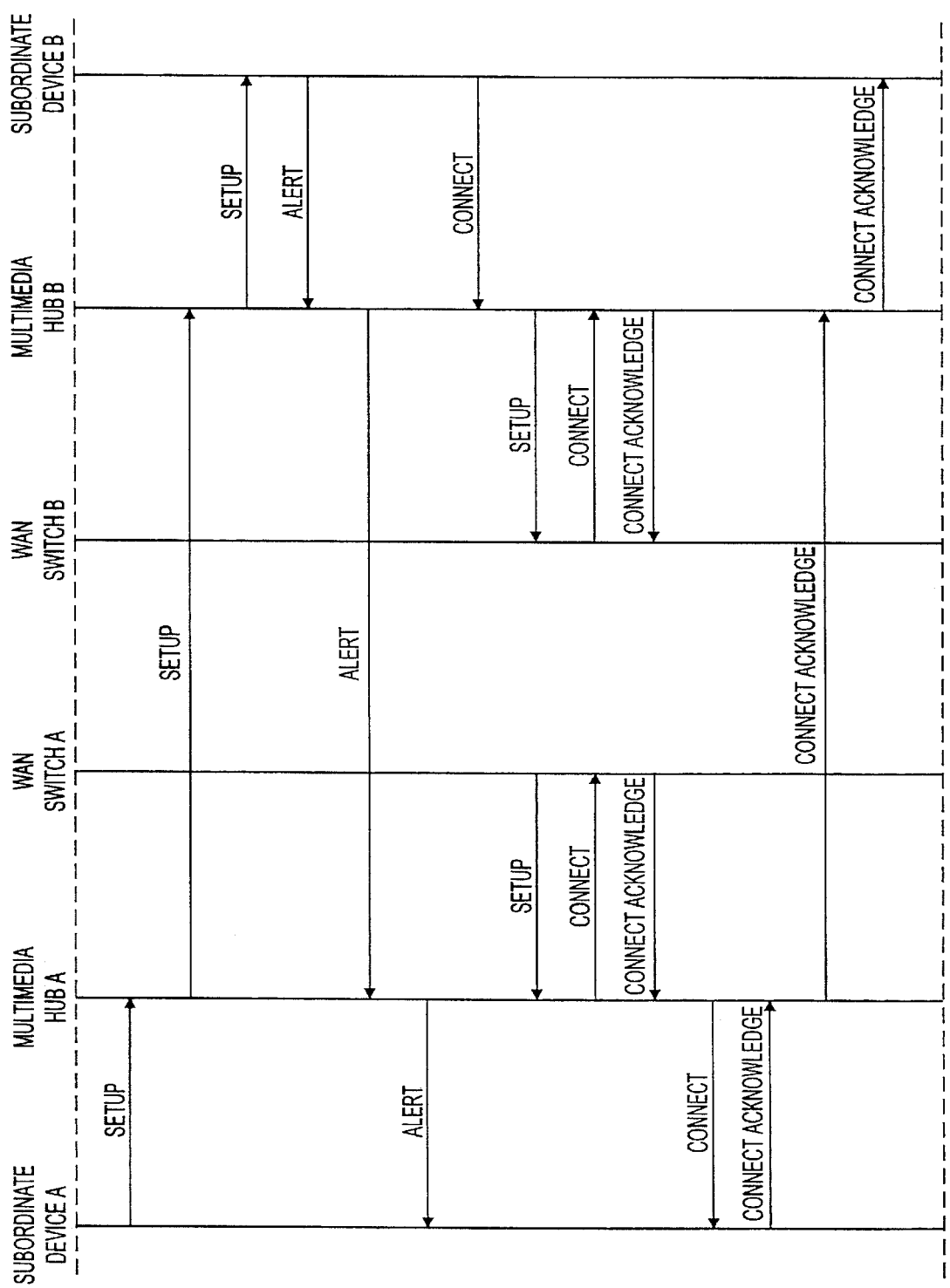
FIG. 4 illustrates a flow diagram of another embodiment of the signaling messages between two subordinate devices associated with separate networks according to the principles of the present invention.

As illustrated in the preferred embodiment of FIG. 3, endpoint A 125A of the first private network partition 210 is attempting to communicate with endpoint B 125B of the second private network partition 220. Endpoints A and B 125A, 125B are associated with the first and second private network partitions 210, 220, respectively. However, for the purposes of FIG. 4, endpoints A and B 125A, 125B are shown separate from the first and second private network partitions 210, 220, respectively, to clearly illustrate the network signalling.

The signalling commences with a request message 1 330 transmitted by endpoint A 125A to the first private network partition 210. The first private network partition 210, in response, sends a request message 2 333 to the second private network partition 220, and the second private network partition 220, then responds by sending a request message 3 336 to endpoint B 125B. Endpoint B 125B may respond by sending a response message 1 339 to the second private network partition 220. The second private network partition 220 sends a response message 2 342 to the first private network partition 210, and the first private network partition 210, then sends a response message 3 345 to endpoint A 125A. Connect message 1 348, from endpoint B 125B, indicates the start of the connection request phase between endpoint B 125B and endpoint A 125A.

Request message 4 351 is an initiation request between the second private network partition 220 and the ATM network 300. The ATM network 300 responds by sending a call proceeding message 1 354, or its functional equivalent, to the second private network partition 220, thereby signalling the second private network partition 220 that the ATM network 300 is processing the call request. Request message 5 357 is an initiation request between the ATM network 300 and the first private network partition 210. The first private network partition 210 responds by sending a call proceeding message 1 360, or its functional equivalent, to the ATM network 300. This represents an extension of the initial call request through the ATM network 300.

Using the information supplied in the calling party subaddress information element of request message 5 357 originated in request message 4 351, the first private network partition 210 relates this call request from the information transport network, in this case the ATM network 300, to the original call request initiated by endpoint A 125A and thereby issues a connect message 2 363 to the ATM network 300. The ATM network 300 responds with connect acknowledge message 1 366. Simultaneously, if sufficient bandwidth is available between the ATM network 300 and the second private network partition 220, connect message 3 369 is transmitted from the ATM network 300 to the second private network partition 220 and the second private network partition 220 responds with connect acknowledge message 2 372.

After the ATM network 300 is connected to the first and second private network partitions 210, 220, connect message 4 375 is transmitted from the second private network partition 220 to the first private network partition 210. The first private network partition 210 then sends a connect acknowledge message 3 378. The first private network partition 210 then transmits a connect message 5 381 to endpoint A 125A and endpoint A 125A may respond with a connect acknowledge message 4 384. Finally, the second private network partition 220 responds to connect acknowledge message 3 378 by sending a connect acknowledge message 5 387 to endpoint B 125B.

At this point the endpoint A 125A of the first private network partition 210 is connected to endpoint B 125B of the second private network partition 220. The user information path 240 (not shown) over the ATM network 300 between the subordinate device or first endpoint of the first private network partition 210 and the subordinate device or second endpoint of the second private network partition 220 is selectively established upon the completion of the signalling functions thereby saving valuable bandwidth in the network.

The present invention is equally applicable to other networks within the information transport network or otherwise. For example, if the first and second private network partitions 210, 220 are connected across a WAN, the signalling channel 230 may use a routed packet network (either dedicated or through a public carrier) technology such as frame relay, and the user information path 240 may use a circuit mode connection service such as ISDN PRI through the public network. The signalling system of the present invention would operate in very much the same manner. Thus, the end result in any network would be the equivalent. The user information path 240 (not shown) over the WAN between the subordinate device or first endpoint of the first private network partition 210 and the subordinate device or second endpoint of the second private network partition 220 would be selectively established only upon the completion of the signalling functions thereby saving valuable bandwidth in the network. Additionally, features not involving connection could also be invoked and received through the networks.

From the above description, it is apparent that the present invention provides a system and method for selectively establishing a user information path over an information transport network between first and second endpoints of first and second private network partitions, respectively. The system comprises: (1) signalling circuitry, associated with the first and second private network partitions, adapted to establish a signalling channel adapted to communicate signalling messages between the first and second private network partitions, the signalling channel allowing: (a) the first private network partition to initiate a call request to the second private network partition to request initiation of a call from the first endpoint to the second endpoint and (b) the second private network partition to initiate a response to the call request of the first private network partition to acknowledge that the second endpoint is able to receive the call from the first endpoint and (2) switching circuitry, associated with the first and second private network partitions, adapted to establish a user information path over the information transport network only after the first private network partition receives the response to the call request, the user information path adapted to allow point-to-point communication of user information between the first and second endpoints, the user information path never established if the second endpoint is unable to receive the call from the first endpoint.

Although the present invention and its advantages have been described in detail, those skilled in the art should understand that they can make various changes, substitutions and alterations herein without departing from the spirit and scope of the invention in its broadest form.

What is claimed is:

1. A system for selectively establishing a user information path over an information transport network between first and second endpoints of first and second private network partitions, respectively, comprising:

signalling circuitry, associated with said first and second private network partitions, adapted to establish a signalling channel adapted to communicate signalling messages between said first and second private network partitions, said signalling channel allowing:
    (a) said first private network partition to initiate a call request to said second private network partition to request initiation of a call from said first endpoint to said second endpoint, and
    (b) said second private network partition to initiate a response to said call request of said first private network partition to acknowledge that said second endpoint is able to receive said call from said first endpoint; and switching circuitry, associated with said first and second private network partitions, adapted to establish a user information path over said information transport network only after said first private network partition receives said response to said call request, said user information path adapted to allow point-to-point communication of user information between said first and second endpoints, said user information path never established if said second endpoint is unable to receives said call from said first endpoint.

2. The system as recited in claim 1 wherein said signalling circuitry establishes said signalling channel over said information transport network.

3. The system as recited in claim 1 wherein said information transport network is selected from the group consisting of:

a wide area network (WAN), and
    an Asynchronous Transfer Mode (ATM) network.

4. The system as recited in claim 1 wherein said signalling circuitry encapsulates said signalling messages transmitted between said first and second private network partitions in packets, said packets including information uniquely identifying said first and second endpoints.

5. The system as recited in claim 1 wherein said signalling circuitry establishes said signalling channel over an Asynchronous Transfer Mode (ATM) network, a calling party sub-address field of a Q.931 message relating said signalling messages.

6. The system as recited in claim 1 wherein said first and second private network partitions are adapted to communicate data selected from the group consisting of:

voice,
    video, and
    data.

7. The system as recited in claim 1 wherein said signalling channel is a nailed channel coupling said first and second private network partitions.

8. The system as recited in claim 1 wherein said first private network partition comprises a manager subsystem containing said signalling circuitry and a hub subsystem, coupled to said manager subsystem, containing said switching circuitry.

9. The system as recited in claim 1 wherein said request and response messages are Q.931 signalling messages.

10. The system as recited in claim 1 wherein said first and second endpoints comprise Integrated Services Terminal Equipment (ISTE).

11. A method of selectively establishing a user information path over an information transport network between first and second endpoints of first and second private network partitions, respectively, comprising the steps of:

initially establishing a signalling channel adapted to communicate signalling messages between said first and second private network partitions with signalling circuitry associated with said first and second private network partitions, said signalling channel allowing:
    (a) said first private network partition to initiate a call request to said second private network partition to request initiation of a call from said first endpoint to said second endpoint, and
    (b) said second private network partition to initiate a response to said call request of said first private network partition to acknowledge that said second endpoint is able to receive said call from said first endpoint; and subsequently establishing a user information path over said information transport network only after said first private network partition receives said response message with switching circuitry associated with said first and second private network partitions, said user information path adapted to allow point-to-point communication of user information between said first and second endpoints, said user information path never established if said second endpoint is unable to receive said call from said first endpoint.

12. The method as recited in claim 11 wherein said step of initially establishing comprises the step of initially establishing said signalling channel over said information transport network.

13. The method as recited in claim 11 wherein said information transport network is selected from the group consistins of:

a wide area network (WAN), and
    an Asynchronous Transfer Mode (ATM) network.

14. The method as recited in claim 11 wherein said step of initially establishing comprises the step of encapsulating said signalling messages transmitted between said first and second private network partitions in packets, said packets including information uniquely identifying said first and second endpoints.

15. The method as recited in claim 11 wherein said signalling channel is established over an Asynchronous Transfer Mode (ATM) network, said method further comprising the step of relating said signalling messages with a calling party sub-address field of a Q.931 message.

16. The method as recited in claim 1 further comprising the step of communicating data in said first and second private network partitions, said data selected from the group consisting of:

voice, video, and data.

17. The method s recited in claim 11 further comprising the step of provisioning a nailed channel coupling said first and second private network partitions to provide a medium for initially establishing said signalling channel.

18. The method as recited in claim 11 wherein said step of initially establishing comprises the step of initially establishing said signalling channel with a manager subsystem of said first private network partition, said manager subsystem containing said signalling circuitry and said step of subsequently establishing comprises the step of subsequently establishing said user information path with a hub subsystem of said first private network partition coupled to said manager subsystem and containing, said switching circuitry.

19. The method as recited in claim 11 wherein said request and response messages are Q.931 signalling messages.

20. The method as recited in claim 11 further comprising the step of receiving said call request and said response to said call request into said first and second endpoints, respectively, said first and second endpoints comprising Integrated Services Terminal Equipment (ISTE).

* * * * *

UNITED STATES PATENT AND TRADEMARK OFFICE
CERTIFICATE OF CORRECTION

PATENT NO. : 5,659,542
DATED : August 19, 1997
INVENTOR(S) : Robert T. Bell, et al.

It is certified that error appears in the above-indentified patent and that said Letters Patent is hereby corrected as shown below:

Col. 17, line 45, "receives" should be --receive--.

Col. 18, line 50, "consistins" should be --consisting--.

Signed and Sealed this

Eleventh Day of November, 1997

Attest:

Attesting Officer

BRUCE LEHMAN

Commissioner of Patents and Trademarks